United States Patent
de Freitas Silvestre

(10) Patent No.: US 9,228,346 B2
(45) Date of Patent: Jan. 5, 2016

(54) SUPPORTING ELEMENT FOR PIPES IN BUILDINGS AND APPLICATION METHOD OF A PIPE SUPPORTING ELEMENT IN A FLAGSTONE

(71) Applicant: Wladimir de Freitas Silvestre, Carapicuiba (BR)

(72) Inventor: Wladimir de Freitas Silvestre, Carapicuiba (BR)

(\*) Notice: Subject to any disclaimer, the term of this patent is extended or adjusted under 35 U.S.C. 154(b) by 0 days.

(21) Appl. No.: 14/353,603

(22) PCT Filed: Oct. 29, 2012

(86) PCT No.: PCT/BR2012/000417
§ 371 (c)(1),
(2) Date: Apr. 23, 2014

(87) PCT Pub. No.: WO2013/059900
PCT Pub. Date: May 2, 2013

(65) Prior Publication Data
US 2014/0260013 A1    Sep. 18, 2014

(30) Foreign Application Priority Data
Oct. 28, 2011    (BR) ..................... 1106760

(51) Int. Cl.
| | |
|---|---|
| *E04C 2/52* | (2006.01) |
| *E04B 5/48* | (2006.01) |
| *F16L 5/14* | (2006.01) |
| *H02G 3/22* | (2006.01) |

(Continued)

(52) U.S. Cl.
CPC ... *E04B 5/48* (2013.01); *E04G 9/08* (2013.01); *E04G 15/061* (2013.01); *F16L 3/00* (2013.01); *F16L 3/222* (2013.01); *F16L 5/14* (2013.01); *H02G 3/22* (2013.01)

(58) Field of Classification Search
CPC .............. E04B 5/48; F16L 3/222; F16L 3/00; F16L 5/14; E04G 15/061; H02G 3/22
USPC .............................................. 52/220.1, 220.8
See application file for complete search history.

(56) References Cited

U.S. PATENT DOCUMENTS

| | | |
|---|---|---|
| 2,694,847 A | 11/1954 | Christiansen |
| 4,619,087 A | 10/1986 | Harbeke |

(Continued)

FOREIGN PATENT DOCUMENTS

| | | |
|---|---|---|
| BR | MU 8702522 U | 6/2008 |
| BR | MU 8702777 U2 | 11/2008 |

(Continued)

OTHER PUBLICATIONS

International Searching Authority, International Search Report (ISR) and Written Opinion for International Application No. PCT/BR2012/000417, mailed Dec. 11, 2012, 13 pages, National Institute of Industrial Property, Brazil.

*Primary Examiner* — Joshua J Michener
*Assistant Examiner* — Keith Minter
(74) *Attorney, Agent, or Firm* — Alston & Bird LLP

(57) ABSTRACT

This relates to a pipe supporting element (1) used to contain a pipe (15) that is used in buildings for hydraulic, electrical and other pipes. In one preferred arrangement, the aforementioned pipe supporting element comprises polyethylene foam, is as thick as a partition (wall or paving slab), has at least two anchoring points located on the side faces (3) thereof, and includes at least one through hole (2) between a first face (1) and a second face (2).

9 Claims, 11 Drawing Sheets

(51) Int. Cl.
*E04G 15/06* (2006.01)
*F16L 3/00* (2006.01)
*F16L 3/22* (2006.01)
*E04G 9/08* (2006.01)

(56) References Cited

U.S. PATENT DOCUMENTS

| | | |
|---|---|---|
| 4,804,160 A | 2/1989 | Harbeke |
| 6,348,657 B1* | 2/2002 | Haslock et al. ............... 174/659 |
| 2001/0037835 A1* | 11/2001 | Shimizu ......................... 138/106 |
| 2006/0096195 A1* | 5/2006 | Zierer ........................... 52/220.1 |
| 2006/0265980 A1* | 11/2006 | Vaughan ....................... 52/220.8 |
| 2006/0272243 A1* | 12/2006 | Carew et al. ................. 52/220.1 |
| 2010/0148018 A1* | 6/2010 | Schoenau et al. ............. 248/74.4 |
| 2011/0088917 A1* | 4/2011 | Lee .................................. 169/45 |
| 2011/0186349 A1* | 8/2011 | Troetzschel et al. ........... 174/650 |
| 2012/0032036 A1* | 2/2012 | Andersson et al. ........... 248/74.1 |
| 2012/0097405 A1* | 4/2012 | Cordts et al. .................... 169/45 |
| 2014/0042712 A1* | 2/2014 | O'Connor et al. ............. 277/606 |

FOREIGN PATENT DOCUMENTS

| | | |
|---|---|---|
| GB | 2437626 A | 10/2007 |
| JP | 2005-307468 A | 11/2005 |
| JP | 2010-285856 A | 12/2010 |
| KR | 20110071695 A | 6/2011 |
| WO | WO 01/18327 A1 | 3/2001 |

\* cited by examiner

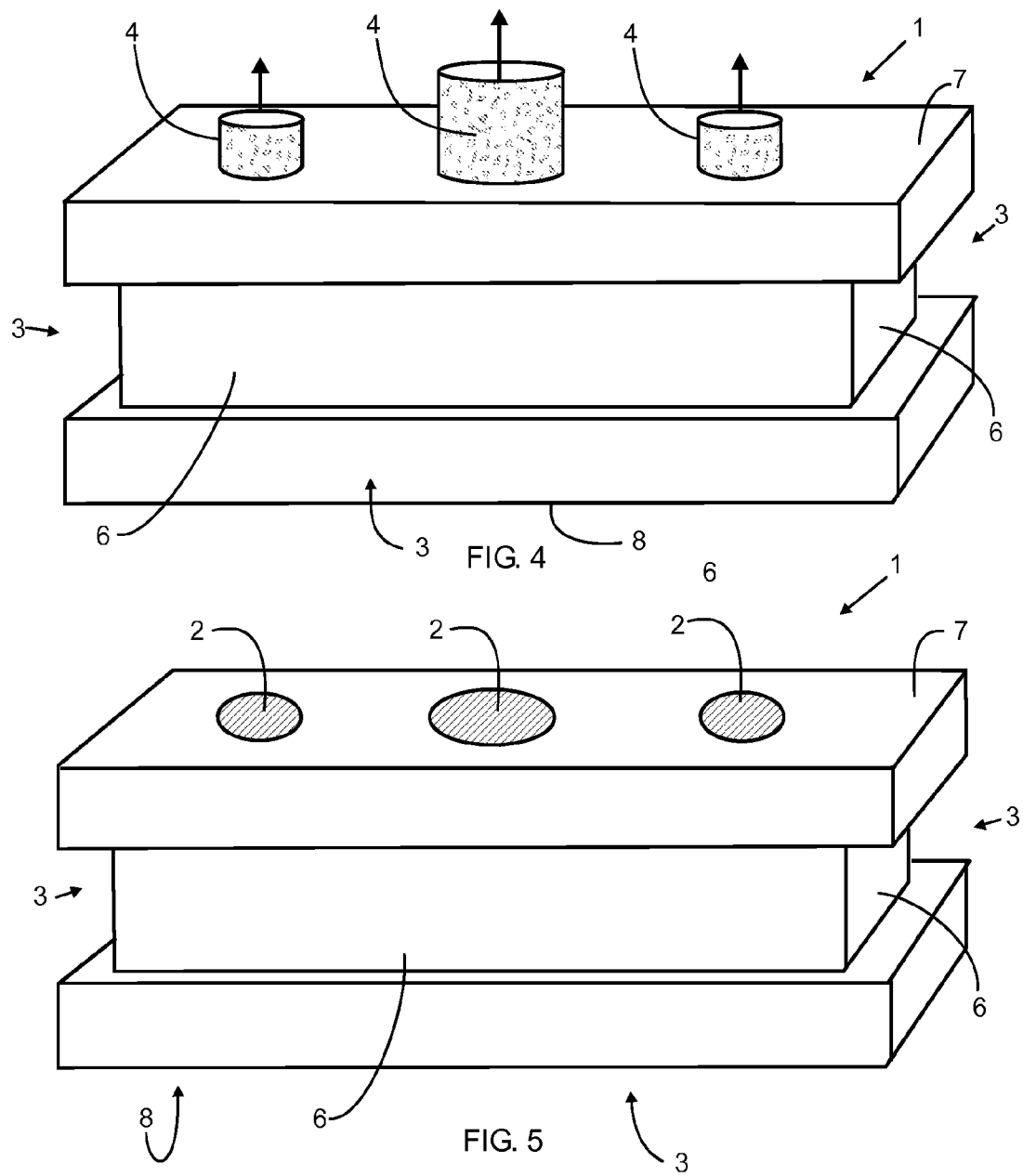

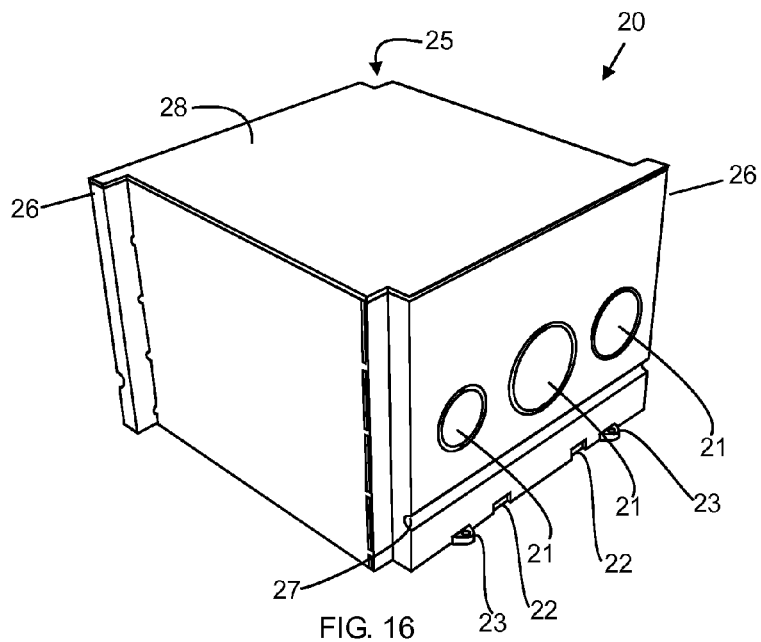
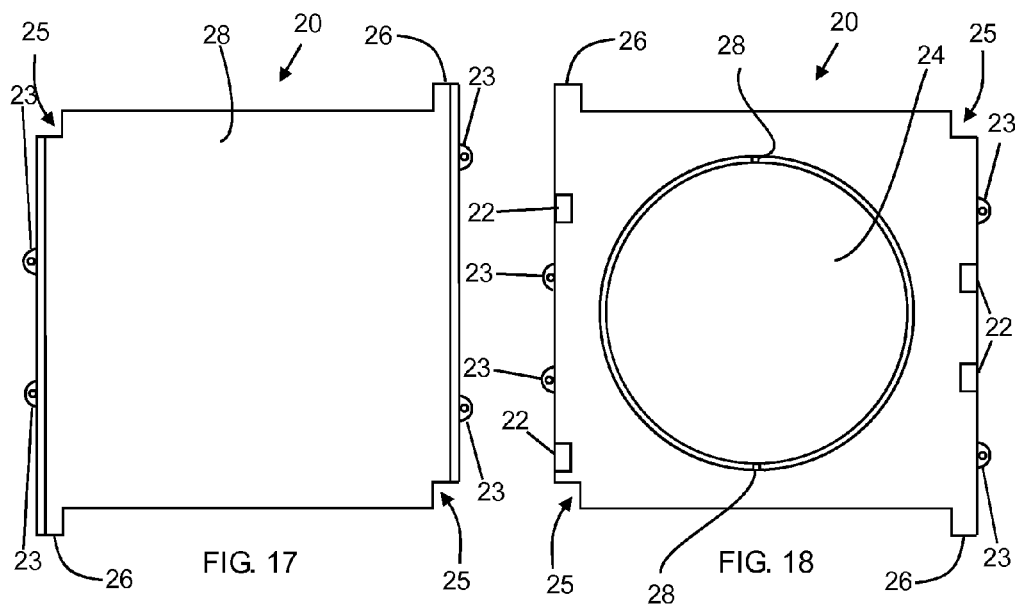

SUPPORTING ELEMENT FOR PIPES IN BUILDINGS AND APPLICATION METHOD OF A PIPE SUPPORTING ELEMENT IN A FLAGSTONE

CROSS REFERENCE TO RELATED APPLICATIONS

This application is a National Stage Application, filed under 35 U.S.C. §371, of International Application No. PCT/BR2012/000417, filed Oct. 29, 2012, which claims priority to and the benefit of Brazilian Application No. PI1106760-8, filed Oct. 28, 2011; the contents of both of which are hereby incorporated by reference in their entirety.

BACKGROUND

1. Related Field

The present invention relates to a tubing support for application in buildings, application on dividers such as partition walls and slabs, configured to accommodate water tubing, electricity and gas lines in a stable position on divider.

2. Description of Related Art

Upon carrying out works in the field of civil construction, there are steps that consist in installing tubing pieces, which are designed to communicate various parts of a building.

Such tubing may be hydraulic (water and sewage); electric, which houses electric cables; or still gas tubing, which distribute gas for use on stoves, boilers and other heating systems.

Such tubing can be installed in various ways. One of them consists in perforating already-built dividers (i.e. walls and slabs), laying tubing and covering with concrete the spaces that had been opened for accommodating such tubing.

Another way to install tubing, for instance, through shaft or vertical galleries, is achieved above all by passing the tubing between the slabs of a building. It is described in detail hereinafter.

During the process of pouring concrete of a slab, after laying the iron bars and before pouring the concrete onto the slab mold, a few wooden crates are fixed onto the mold floor at the places where the hydraulic tubing will pass in the future. After the concrete have cured, the crates are removed, leaving rectangular openings in the slab, allowing communication between the floors.

In said rectangular openings one positions tubing (such as hydraulic, electric and system tubing, among others). After positioning the tubing, the last step of this process consists in closing with concrete the whole volume existing between the tubing and the rectangular opening. This, in turn, is carried out by securing wooden sheets on the lower slab face, and pouring concrete into the empty space between the tubing and the rectangular opening through the upper slab face.

It should be noted that this process (just as the first one, described in the beginning of this specification), is time consuming and expensive. It should be noted that, besides consuming time and money, this process may bring other drawbacks, as will be disclosed hereinafter.

The wooden crate employed to form the rectangular spacing is generally fixed with nails onto the slab-mold floor and, in relatively high buildings, the slab mold is impaired by frequent fixation and removal of the wood crates.

Another drawback is the lack of dimensional precision in positioning the tubing, which is inherent in employing this process. It is known that this process may entail variation in the positioning of the tubes with respect to the slab, which, as a result, may alter the positioning of the tubing on a determined building floor.

A third problem, besides the high cost and long time for carrying out this process, is that the concrete used for filling the space between the slab and the tubing, after having hardened in its curing process, leads to sound vibrations and thermal energy from the tubing to the slab and to the environment adjacent the slab. Additionally, such prior-art procedures generate debris and slowness in developing the work due to the need for a complementary step for concreting (see FIG. 1).

Therefore, one concludes that the technical solutions employed at present in tubing installations—perforation of existing dividers and the process that makes use of fixing wooden boxes onto the slab molds before concreting=cause great drawbacks before, during and after the carrying-out thereof.

BRIEF SUMMARY

The present invention has the objective of achieving a prefabricated tubing support, which reduces the costs and time for carrying out the installation of tubing in building construction works.

The present invention has also the objective of achieving a tubing support configured to provide accommodation for hydraulic, electric or other tugging of a building installation.

The present invention further has the objective of providing a tubing support that is configured for insulating a slab from sound and thermal energy from the tubing.

The present invention has also the objective of providing a process for installing tubing that is capable of aiding in standardization of the positioning of tubes inside a construction, thus preventing failures due to inaccuracy in positioning the tubing.

Finally, the present invention further has the objective of providing a process of installing tubing that will not damage the slab mold with the successive fixation and removal of wooden boxes.

The objectives of the present invention are achieved by means of a building tubing support comprising a first face and a second face that are substantially flat and arranged in opposition, at a distance capable of defining a height, configuring the tubing support with a polyhedral geometric form or rounded-body shape, the tubing-support height defining at least one side face comprising at least two anchorage points arranged in opposition and positioned between the first face and the second face; the tubing support further comprising at least one through-bore that communicates the first face and the second face and enables accommodation of a tube inside it; the tubing support being configured to be arranged between two faces of a divider, facing them and enabling at least one tube to pass through the divider through at least one through-bore.

The objectives of the present invention are also achieved by means of a method of applying a tubing support to a slab, which comprises the following steps:

Step 1: fixing the tubing support at the desired place;
Step 2: concreting the slab;
Step 3: removing the fill foams from inside the through-bores;
Step 4: positioning the tubes inside the through-bores.

The objectives of the present invention are also achieved by means of a tubing support that comprises a first face and a second face that are substantially flat and arranged in opposition, at a distance capable of defining a height configuring the tubing support with a polyhedral form or rounded-body shape, the tubing-support height defining at least one side face, the tubing support comprising at least one permanent layer and one removable layer, and the tubing support being configured to be arranged between two divider faces, facing them, enabling at least one tube to pass through the divider through said at least one through-bore formed in the permanent layer after removal of the removable layer.

Finally, the objectives of the present invention are alto achieved by means of a method of applying a tubing support onto a slab, which comprises the following steps:
Step 1: fixing the tubing support at the desired place;
Step 2: concreting the slab;
Step 3: removing the removable layer;
Step 4: perforating a bore in the permanent layer;
Step 5: positioning the tube in the bore made in step 4;
Step 6: applying an additional concrete layer onto the permanent layer, this additional concrete layer being configured to fix the tube at a stable position.

Short Description of the Drawing

BRIEF DESCRIPTION OF THE VARIOUS EMBODIMENTS OF FIGURES

The present invention will now be described in greater detail with reference to an example of embodiment represented in the drawings. The figures show:

FIG. 4 is a perspective top view of a second preferred embodiment of the present invention;

FIG. 5 is a perspective top view of a second preferred embodiment of the present invention disclosing the tubing support after removal of the fill foams;

FIG. 16 is a perspective top view of the present invention of an alternative embodiment called PVC shaft;

FIG. 17 is a top view of the present invention in the alternative PVC shaft embodiment;

FIG. 18 is a lower view of the present invention in the alternative PVC shaft embodiment;

DETAILED DESCRIPTION OF VARIOUS EMBODIMENTS

The tubing support 1 of the present invention, in its preferred embodiment (see FIG. 2), consists of a substantially polyhedral or rounded-body object (for example, a parallelepiped), constituted by a synthetic foam, which is provided with at least two anchorage points which man be provided of at least one through-bore 2 for accommodating a tube 15.

Said tubing support 1 was developed for being used during the concreting step or masonry step of a divider (by a "divider" one means any elements used for dividing rooms, and other environments in a building, such as walls and slabs). In this regard, one should understand that said tubing support 1 can be applied in accommodating any type of tubing, as for instance, hydraulic columns, toilet-bowl tubing, drain, to mention only a few applications. During the construction of a slab, for instance, the tubing support 1 should be fixed to the mold or to the iron bars 16 before the step of pouring the slab, that is, the step that consists in pouring liquefied concrete onto the mold (see FIG. 8).

After the concrete has cured, the tubing support 1—which has thickness similar to that of the slab where it should be applied—remains at the place where it was initially fixed, since its anchorage points keeps it associated to the slab concrete.

Figure 3:
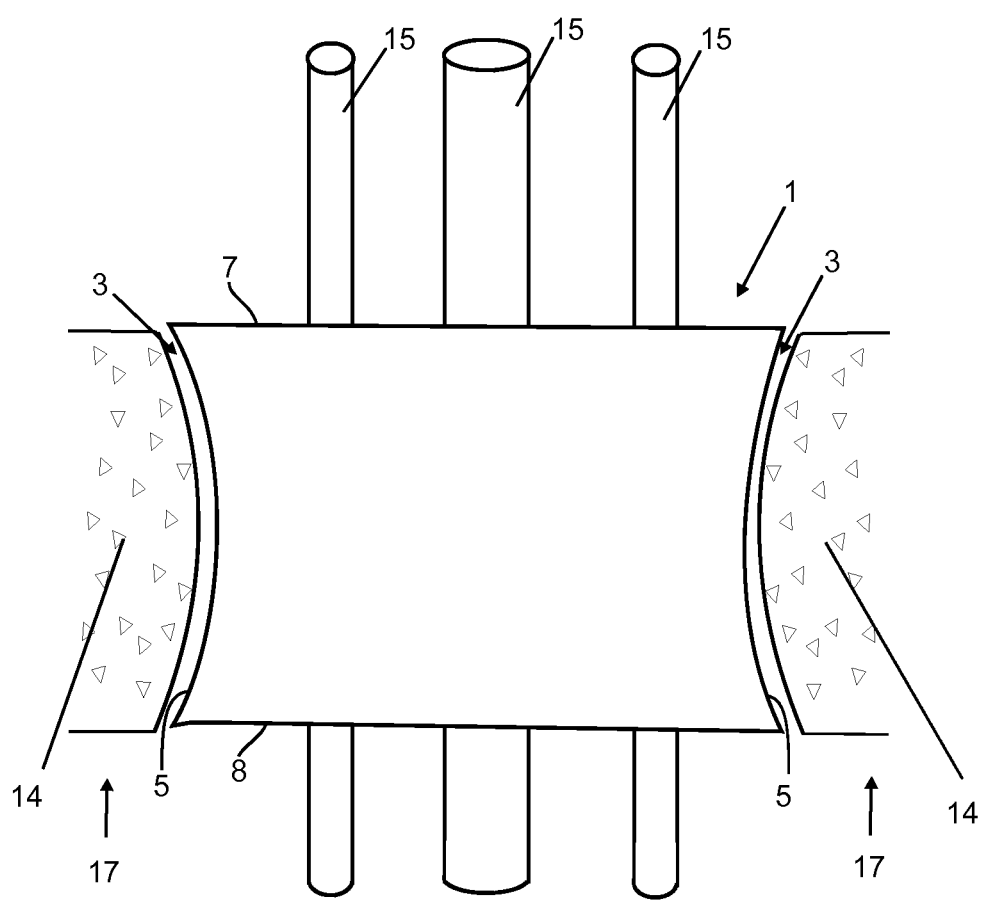
FIG. 3 is a perspective front view of a tubing support of the present invention under application onto a concrete divider.
Figure 6:
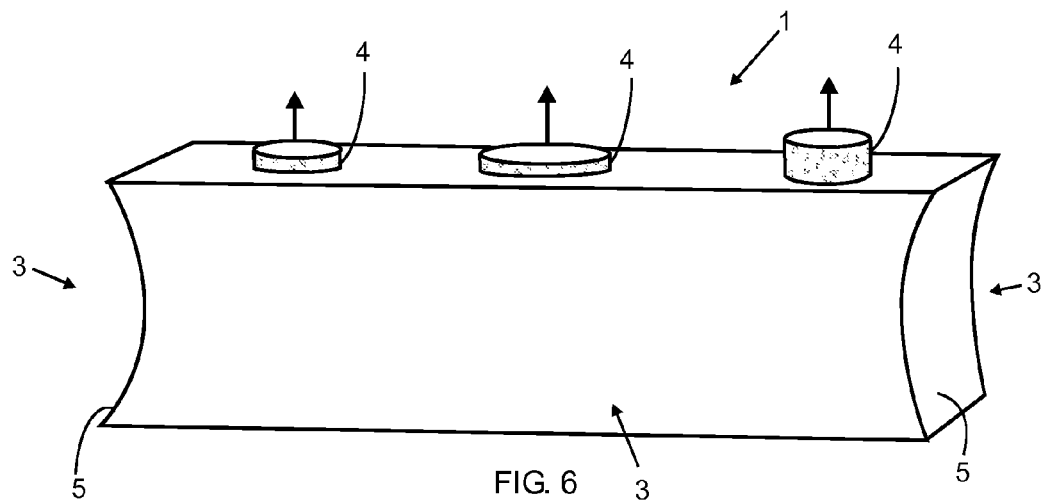
FIG. 6 is a perspective top view of a third preferred embodiment of the present invention.
Figure 9:
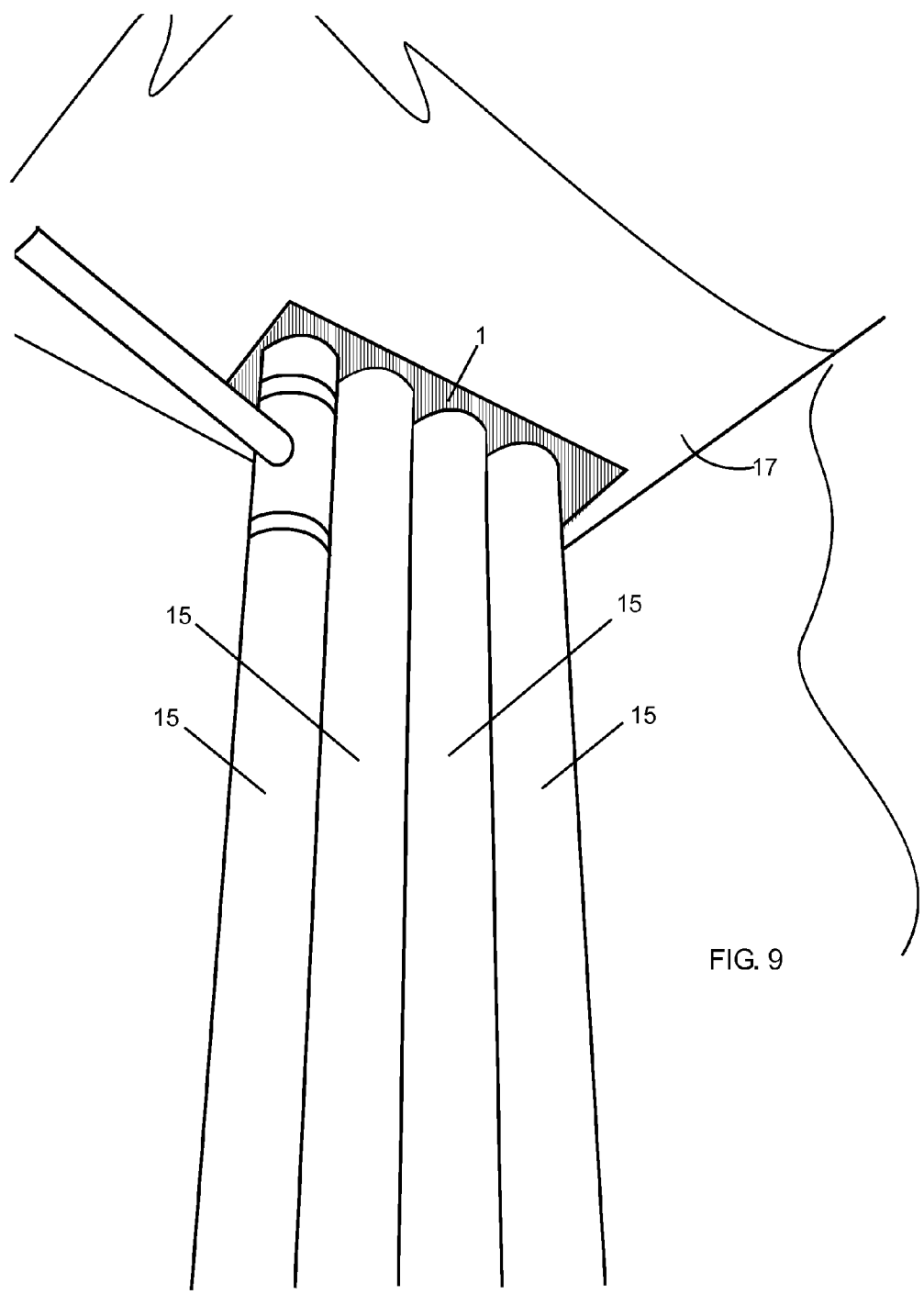
FIG. 9 is a perspective lower view of the tubing support after application thereof onto a slab.
Figure 10:
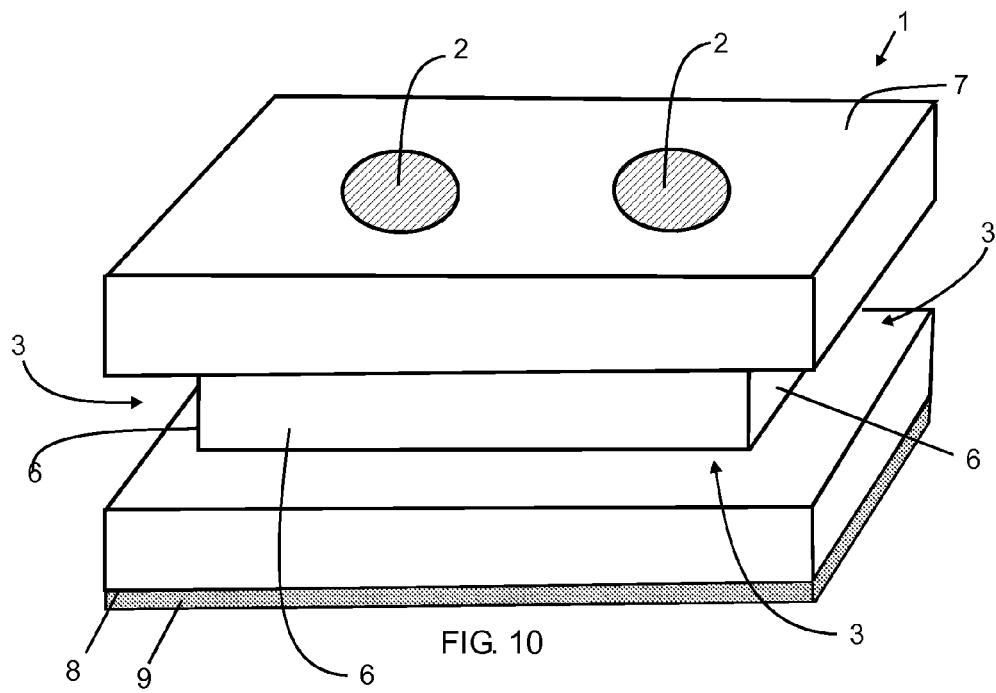
FIG. 10 is a perspective top view of a fourth preferred embodiment of the present invention.

It should be noted that, in the embodiments where the tubing support 1 comprises at least one through-bore 2, which passes through the tubing support transversely from the first face 7 to a second face 8, the tubing support 1 is capable of easily providing accommodation for the tubing of a building after the concrete-curing time of a slab has passed (see FIGS. 3 and 9). In other embodiments, said through-bore 2 may not be a prefabricated item of the tubing support 1. In other words, the through-bores 2 of the tubing support 1 could be made after the slab concreting step, by means of any cutting tool or by pressing the tube 15 onto the first face 7 after concreting.

For a better understanding of the invention, the process of applying the tubing support 1 in a preferred embodiment comprises the following steps:
Step 1: fixing the tubing support 1 onto the desired place;
Step 2: concreting the slab (not shown in the figures);
Step 3: positioning the tubes 15 inside the through-bores 2.

It should be noted that, in general, the main characteristics of this invention are disclosed in the above lines. However, the present invention may comprise various embodiments and constructive details that are part of the same inventive concept, but are capable of imparting different qualities to the tubing support 1.

As disclosed before, the tubing support 1 is preferably provided with an orthogonal outer profile, that is, preferably a tubing support 1 assumes a parallelepiped shape provided with anchorage points on its side faces 3 and at least one through-bore 2 that passes through the tubing support 1 from a first face 7 to a second face 8. However, nothing prevents the tubing support 1 from being provided with a cylindrical, oval shape or as a prism with orthogonal cross-section, for instance, as long as they define two parallel plans, one of these planes corresponding to its first face 7 and the other plane corresponding to the second face 8.

It should be noted that the first and second faces 7, 8 should define, preferably but not compulsorily, substantially flat an parallel-to-each other surfaces or, in other words, they should define parallel plans. This is because each of these faces 7, 8 should be arranged on the same plane comprised by the two faces of a divider (that is, upper and lower faces of a slab or front and back faces of a wall).

With regard to the anchorage of the tubing support 1, it should be noted that it may assume various different forms, elements and arrangements. This anchorage may be provided by pins or protrusions that emerge from the side faces 3 of the tubing support 1. It may be provided with side, recesses, tears or bores distributed over the side faces 3 or still with a concave 5 or convex (not shown in the figures) profile.

The figures of this specification show an anchorage that has a geometry of longitudinal tears 6 (FIGS. 2, 4, 5, 10 and 11) and an anchorage that consists of a concave profile 5 defined on the side faces 3 of the tubing support 1 (FIGS. 6, 7, 10 and 13).

It should be noted that, with regard to the anchorages, one of the most efficient constructive embodiments is achieved by the anchorage with a concave profile 5, represented in detail in FIG. 3. This anchorage with a concave profile 5 enables one to accommodate more easily the concrete gravel 14 in its internal spacing than an anchorage that makes use of a longitudinal tear 6, since the longitudinal tear 6 may not be totally filled with concrete due to the presence of gravel bigger than the tear, which would make it impossible to accommodate the concrete correctly into the tear 6, thus generating empty spaces.

Therefore, the anchorage may be carried out in a number of different ways, and the only common denominator is that the anchorage elements should be arranged between the first face 7 and the second face 8 of the tubing support 1.

When it comes to the arrangement and characteristic of the through-bores 2 in the tubing support 1, it should be noted that the latter may assume numberless geometries, cross-sections, direction and distribution (in both number and space).

Figure 1:
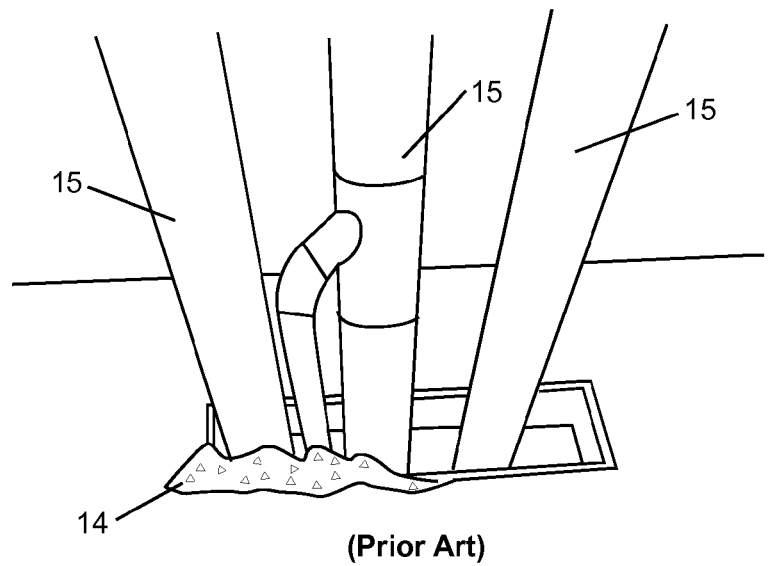
FIG. 1 is a perspective top view of a process of installing hydraulic tubing on prior-art concrete slabs.
Figure 2:
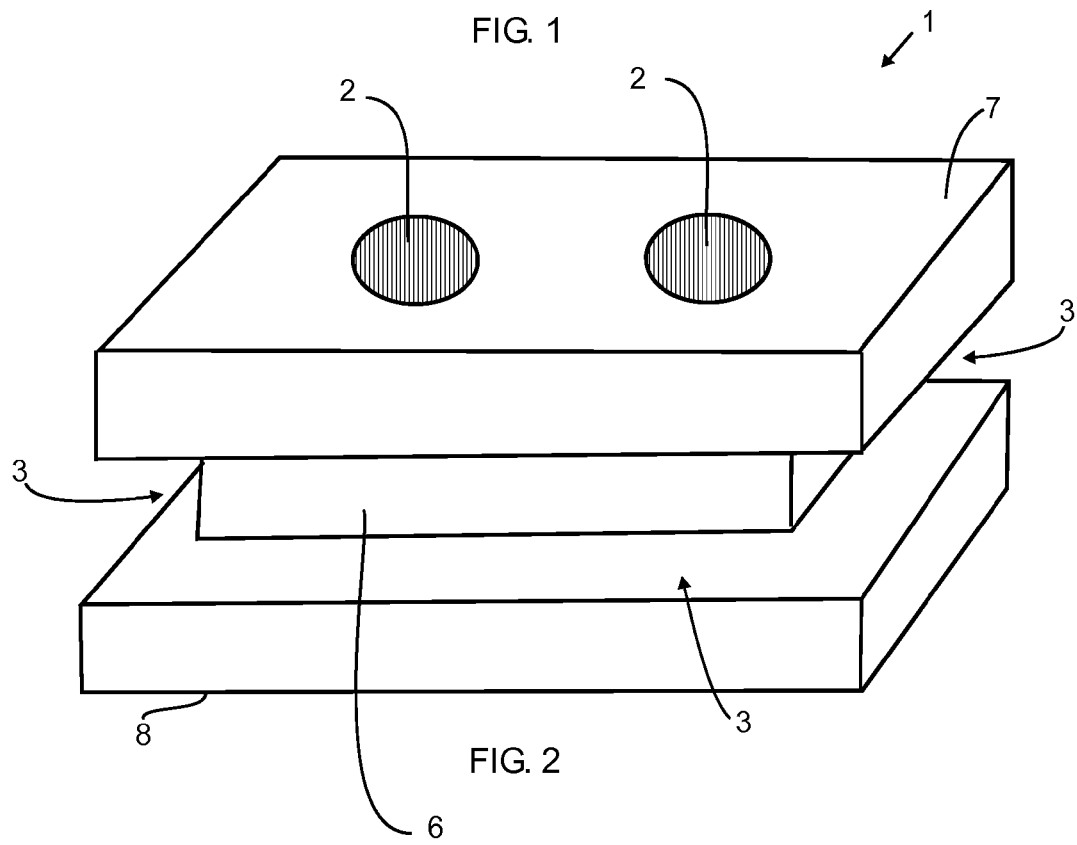
FIG. 2 is a perspective top view of a preferred embodiment of the tubing support of the present invention.
Figure 7:
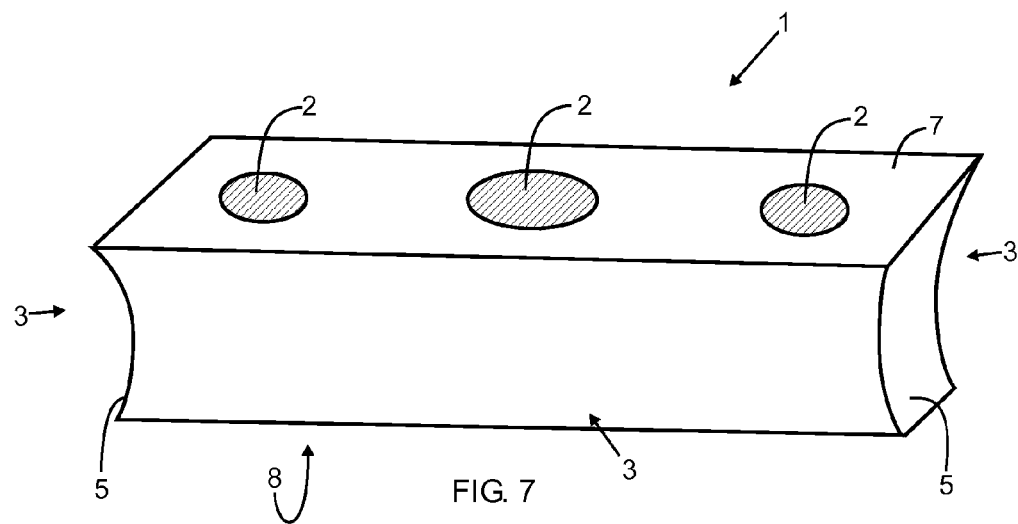
FIG. 7 is a perspective top view of a third preferred embodiment of the present invention after removal of the fill foams.
Figure 8:
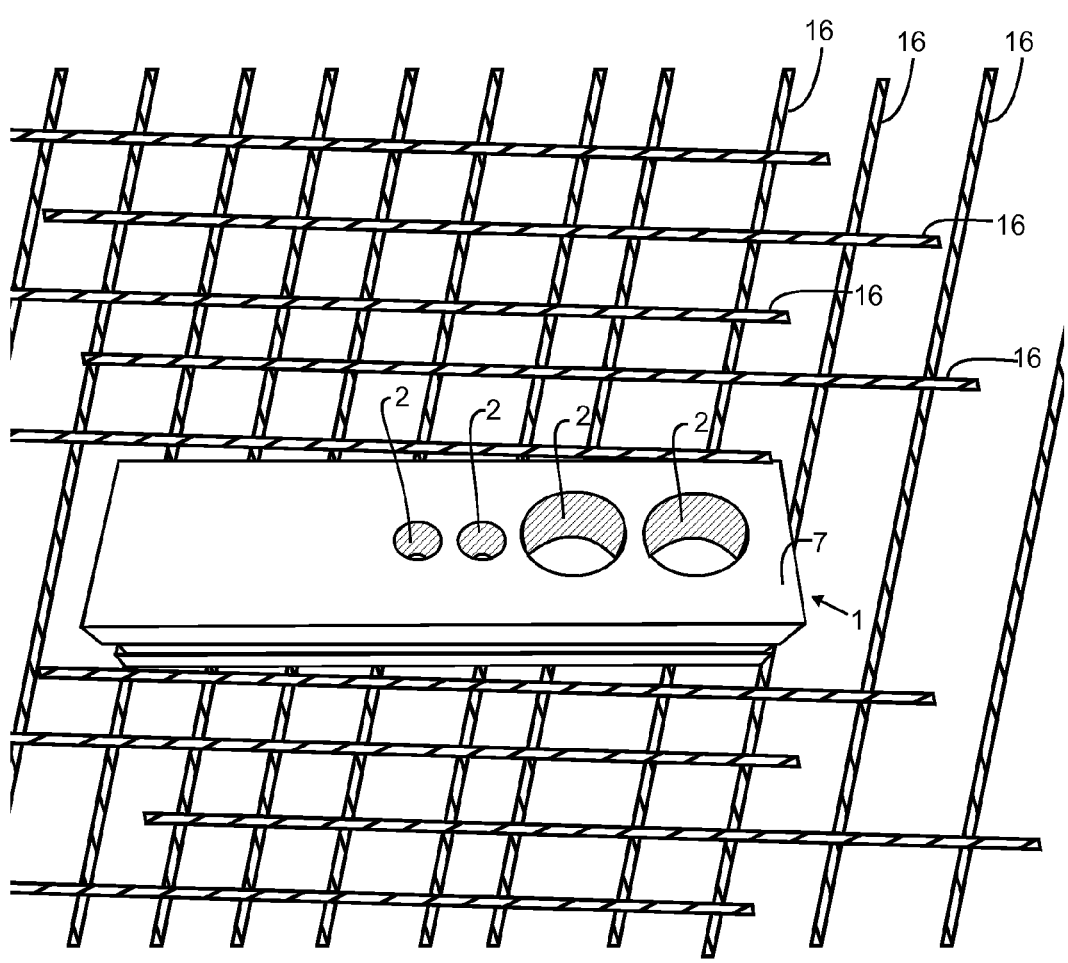
FIG. 8 is a top view of the first step of the method of applying a tubing support onto a slab.

In FIG. 2 the tubing support 1 comprises two through-bores 2 provided with the same inner diameter, arranged symmetrically with respect to the first face 7; and positioned orthogonally with respect to the first and second faces 7, 8. In FIGS. 5 and 7, the tubing support 2 comprises three through-bores 2 of different diameters and symmetrically arranged; and in FIG. 8 are discloses four through-bores of different diameters, arranged at the right end of the tubing support 1. Thus, it is clear that one can achieve any embodiment according to the needs of the design.

It should be further noted that the through-bores 2 may be arranged obliquely with respect to the plane of the first and second face 7, 8, and this arrangement might be useful for applying the tubing support 1 to inclined walls that require horizontally oriented tubing, for instance. A tubing support 1 may further comprise a solution of through-bores 2 in which one portion of the bore will be orthogonal to one of the faces and the other will be oblique, so as to accommodate, for instance, an elbow.

Another important characteristic regarding the through-bores 2 is that, preferably, but not compulsorily, they should be provided with an inner diameter that substantially matches the outer diameter of the tubes that were designed. This is because the tubing support 1 should be capable of supporting tubes 15 in a stable position with respect to its own body. In other words, this similarity in diameters should be capable of causing a slight constriction on the tubes 15, which is capable of keeping them slidingly fixed to the tubing support 1. As will be seen later, such an effect is also a result of the density of the material/foam of the tubing support 1 of the present invention.

Moreover, the through-bores 2, if any, should preferably comprise a material called fill foam 4 (see FIGS. 4 and 6), the function of which is to prevent pieces of gravel and concrete from penetrating the through-bores 2 during the step of concreting the slab, also serving to prevent the tubing support 1 from collapsing internally, reducing the inner diameter of its through-bores 2 during said concreting step, due to the pressure exerted by the liquefied concrete onto the side faces 3 of the tubing support 1. In other words, the use of a solid piece facilitates not only the storage, but also the arrangement of the piece on the slab before concreting. A possible embodiment of a tubing support 1 can be achieved by means of a massive block that is cut to form the through-bores 2, keeping the fill material 4 on the tubing support 1. In this way, the tubing support 1 and the through-bore 2 are of the same material.

It should be noted that, after curing process of the slab concrete has finished, the fill foams 4, if any, should be removed from the tubing support 1, in order to provide space for accommodating the tubes 15. In this regard, when it is provided with fill foams 4, the process of applying the tubing support 1 comprises the following steps:

Step 1: fixing the tubing support 1 at the desired place;
Step 2: concreting the slab;
Step 3: removing the fill foams 4 from inside the through-bores 2 (by previously cutting or cutting in this step);
Step 4: positioning the tubes 15 inside the through-bores 2.

As disclosed, the tubing support 1 may be built from synthetic foam, among the various other possible materials. This synthetic foam is preferably expanded polyethylene (EPE) foam of low density, or equivalent, provided with a density ranging from 15 Kg/m3 to 40 Kg/m3.

It is known that expanded-polyethylene foam is capable of imparting a number of qualities to the tubing support 1. Among these qualities are: lightweight, flexibility in application, capability of absorbing shocks, high heat and sound insulation capability, water-tightness, high resistance to corrosion by chemical substances and decomposition by organic agents.

Each application will have a compromise regarding the ideal density of the tubing support 1, with a view to achieve a balance between the properties of elasticity, flexibility, harness, etc. It should be noted ted a very high density will enable an irreversible plastic deformation during application of the tubing support 1. On the other hand, a very high density may easily lead to fracture of the material. Anyway, other materials or densities might be conceived for the tubing support 1, without this altering the inventive concept of this invention.

Other materials that could be employed in building the tubing support 1 are: rubber, latex, polystyrene, polypropylene, polyurethane rubbers or PVC, besides other flexible and non-foamy materials. Additionally, it is valid to point out that these materials may be applied in building the tubing support 1 and the fill foams 4.

It should be noted that the tubing support 1 may still be composed of a mixture of materials or overlapping layers of different materials. The tubing support 1 could comprise, for instance, an insulating layer 9 arranged on the second face 8 of the tubing support 1, which is configured to insulate the tubing support 1 from, for instance, flames and high temperatures caused by fire. This configuration may be useful to enable the use of the tubing support 1 in accommodating electric tubing, which requires greater protection against fire caused by accidental short-circuits, also in view of the legislation in force (see FIG. 10).

Figure 11:
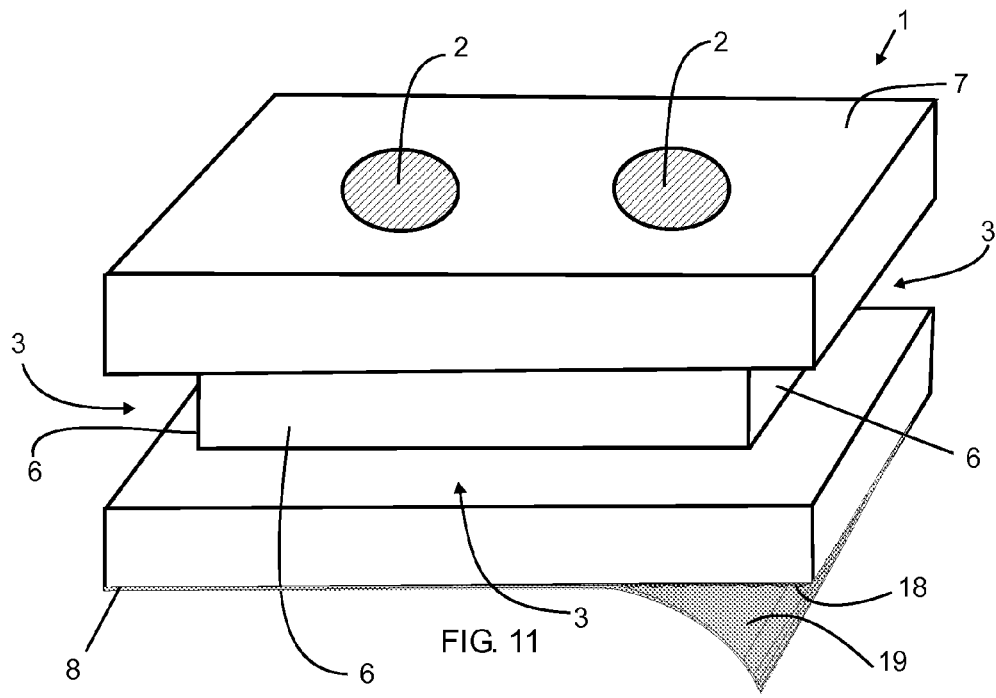
FIG. 11 is a perspective top view of a fifth preferred embodiment of the present invention.

Another additional layer/film that may be added to the tubing support 1 is an adhesive layer 18 arranged on the second face of the tubing support 1 and covered with a plastic film 19 (see FIG. 11). This adhesive layer might be useful in fixing the tubing support 1 onto the wooden slab-mold, before the concreting step. When making use of this alternative configuration, a user of the tubing support 1 should remove the plastic film 19 from the tubing support 1, exposing the adhesive layer 18, the function of which is to enable fixation of the tubing support 1 onto the floor of the slab mold easily. Fixation of the tubing support 1 in the step that comes before the slab concreting may also be carried out by fixation with wires, threads, etc., between the support material and the adjacent ironware.

In a last-but-one alternative configuration presented in this specification, the tubing support 1 may be configured especially for accommodating water drainage tubing associated to a drain.

It should be noted that such particular tubing is more difficult to handle and work than vertical hydraulic tubing that extend along slabs of a building linearly (that is, the tubing represented in FIG. 9). The drainage tubing associated to drains (not shown in the figures) does not exhibit a standardized positioning as the latter does and, as such, the through-bore 2 of the tubing support 1 should not be pre-cut, under pain of not remaining arranged in the correct position.

This drainage tubing can be positioned at different places, according to the specific hydraulic planning of each bathroom or kitchen, for example. Another reason for which this drainage tubing exhibits variation in its positioning at different floors of a building is that this tubing exhibits higher dimensional tolerance with respect to its positioning, because it is arranged on a final branch of the hydraulic system.

Figure 12:
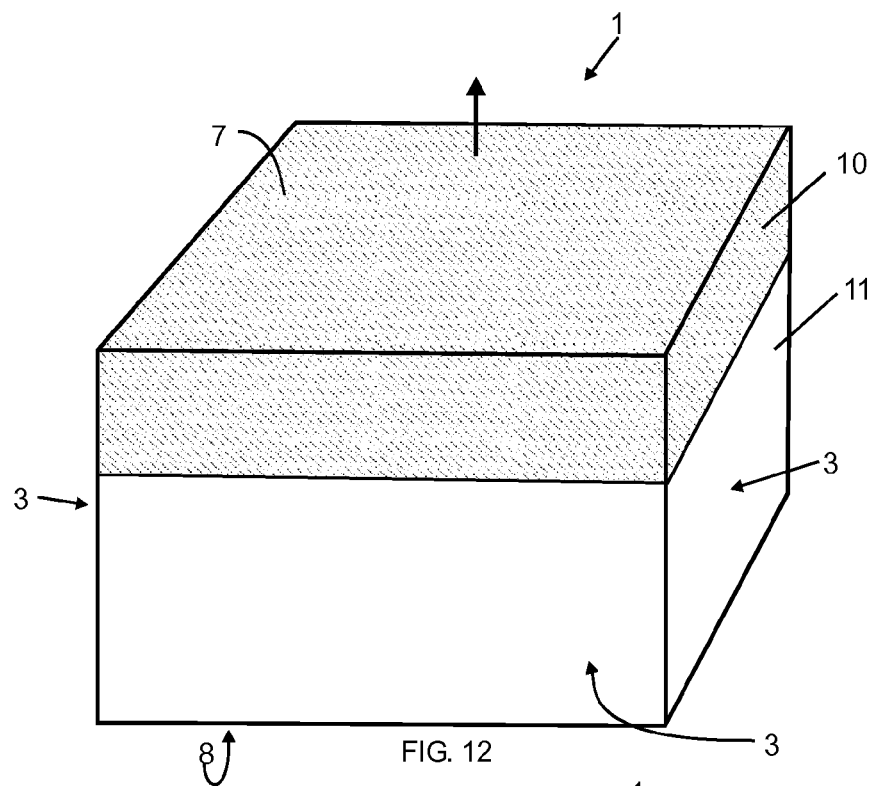
FIG. 12 is a perspective top view of a sixth preferred embodiment of the present invention.
Figure 13:
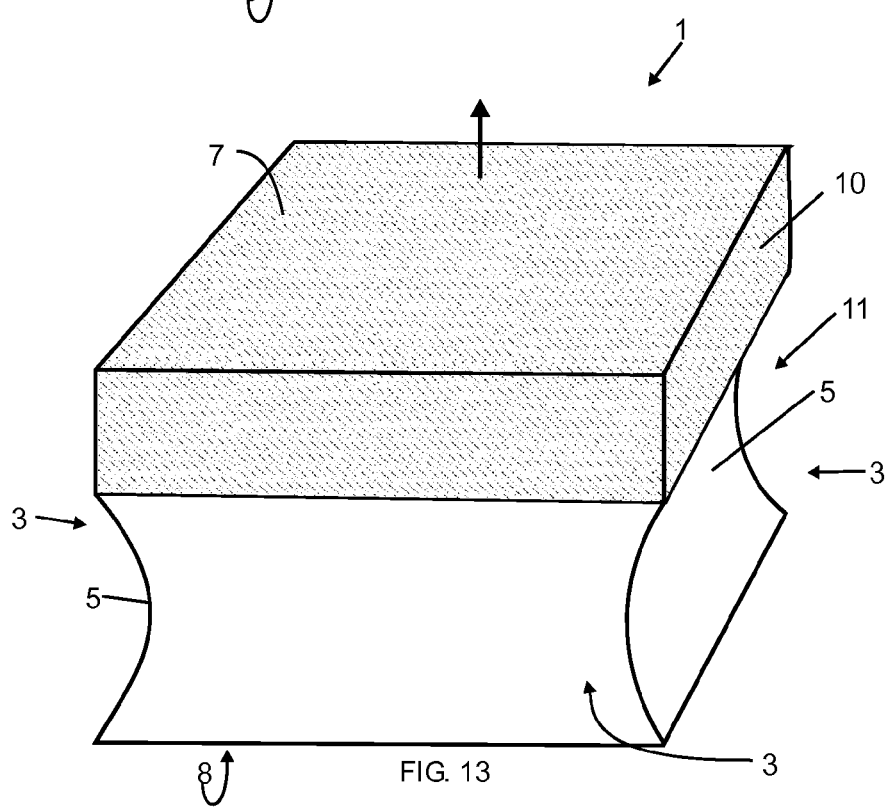
FIG. 13 is a perspective top view of a seventh preferred embodiment of the present invention.

In order to meet the specific needs of this drainage tubing, the present invention has a constructive alternative that comprises at least two overlapping layers 10, 11 and, in its original form (that is, before it is applied to a slab), it does not comprise a through-bore 2, as the embodiments described before do (see FIGS. 12 and 13).

The reason for which this alternative embodiment of the tubing support 1 does not comprise "originally" a through-bore 2 is that this bore should be formed after the process of concreting the slab.

Thus, the reason for which this alternative embodiment comprises two overlapping layers results from the fact that the two layers constitute a removable layer 10 and a permanent layer 11. After the process of installing the tubing support 1 on the slab, that is, after the cure of the concrete, the removable layer 10 is discarded, a perforation is made in the permanent layer 11 for accommodating the tube 15 that will connect the drain and, after passage of the tube 15, a concrete layer if poured up to the slab level, that is, with a height substantially equivalent to that of the removable layer 10. The function of the concrete is to provide a stable association of the tube 15.

The process of employing this tubing support 1 for drainage tubing comprises the following steps:
  Step 1: fixing the tubing support 1 at the desired place;
  Step 2: concreting the slab;
  Step 3: removing the removable layer 10;
  Step 4: perforating a bore in the permanent layer 11;
  Step 5: positioning the tube 15 in the bore made in step 4;
  Step 6: applying an additional concrete layer onto the permanent layer 11 up to the slab height.

It should be noted that the anchorage is optional in this tubing support 1. Anyway, it is possible that the permanent layer 11 (only the permanent layer) comprises anchorage points, such as the concave profiles 5 arranged on the side faces 3 of the tubing support 1 shown in FIGS. 13.

Figure 15:
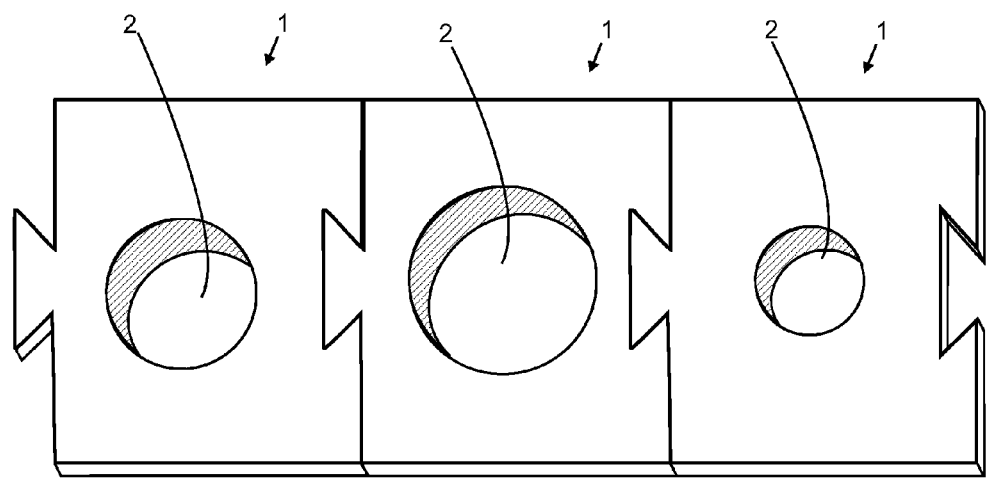
FIG. 15 is a perspective top view of the assembly formed by joining a number of tubing supports associated to each other.

Finally, a last alternative embodiment described in this specification refers to a tubing-support-1 modular assembly, shown in FIG. 15.

Figure 14:
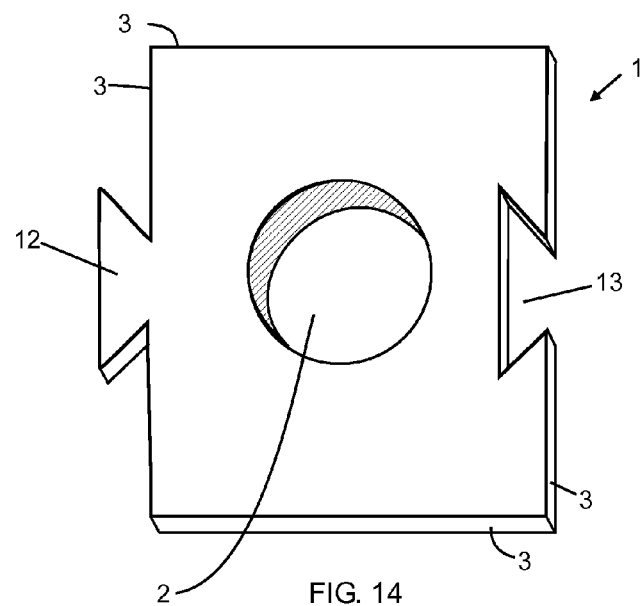
FIG. 14 is a perspective top view of an eighth preferred embodiment of the present invention.

This modular assembly may be formed by joining two or more tubing supports 1 through association between a first association element 12 and a second association element 13 arranged, at least in part, at the side faces 3 of the tubing supports 1. These association elements 12, 13 may comprise, for instance, a protrusion corresponding to a recess located on another tubing support 1 (see FIG. 14).

However, the great purpose of these assemblies is that of enabling that one will meet the needs of any design with only a few parts. In other words, each tubing support 1 would have only a through-bore 2, and might be associated (in a fixed manner or not) to another tubing support).

The great difference lies in the fact that the tubing support 1 of FIGS. 2, 3, 4, 5, 6 arrives at the building site already with the through-bores 2 pre-determined according to the design, requiring a production intended for that construction. Alternatively, each tubing support 1 of the modular assembly will have only one through-bore 2, with various options of diameter. Thus, with few options of through-bore 2, one manages to meet numberless designs, the correct arrangement of each tubing support 1 that composes the module being left up to the assembling step. Such a product would have as the main focus, for instance, the final consumer, and might be sold at a specialized store, so that the stock of a few parts would generate combinations that would meet any and all needs.

Finally, a few alternative embodiments of this invention having been described, it should be noted that any combination among the above-described characteristics is possible. In this regard, it should be noted that it is feasible to conceive, for instance, a tubing-support-1 modular assembly, provides with an anchorage constituted by concave profiles 5, arranged only at the side faces 3, which do not comprise association elements 12, 13 and/or are provides with an adhesive layer 18.

Another alternative embodiment of the present invention is achieved by means of a tubing support 1 made of PVC, which makes use of the same principle used by the preferred embodiment of this invention, in order to achieve the same results of the tubing support 1 described before, providing a simple installation of access to hydraulic tubing and electric wire tubing in buildings.

It should be noted, from FIG. 16 on, that the PVC tubing support 1 consists of a hollow structure, preferably a cubic one, which comprises on its first upper face 7 a cover 28 and, on its second lower face 8, a lower detachable bore 25. At the sides, the PVC tubing support 1 may comprise one or more detachable side bores 21 and an anchoring recess 27. Naturally, the tubing support 1 of this embodiment can be achieved with PVC material or any other polymeric material that is suitable to the application.

Figure 20:
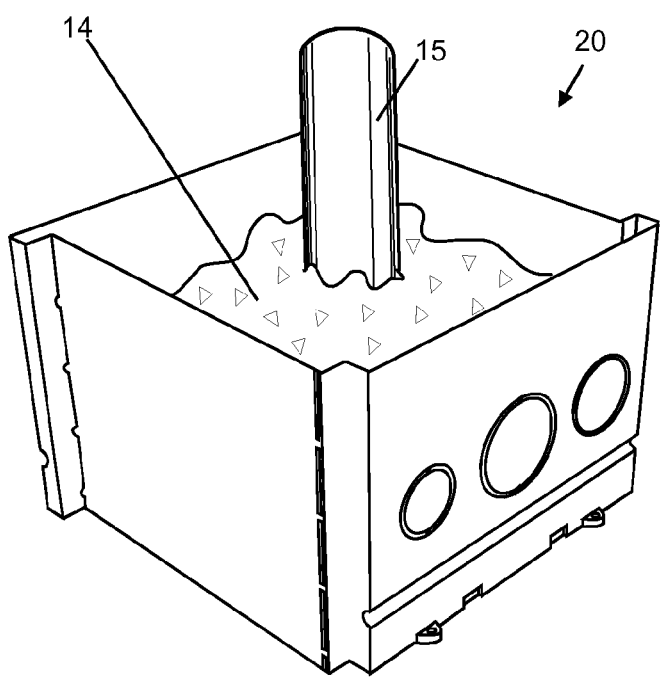
FIG. 20 is a top view of the present invention in its alternative embodiment called PVC shaft during the application phase.

Like the embodiment of the tubing support 1 of FIGS. 1 to 15, in this alternative embodiment, the tubing support 1 should be initially positioned at the slab anchorage place and, after the steps of pouring and curing the concrete 14, the tubing support 1 will remain fixed to the slab structure, providing access to one or more tubes 15 (see FIG. 20). This connection can orient the tubes both vertically and horizontally.

Figure 19:
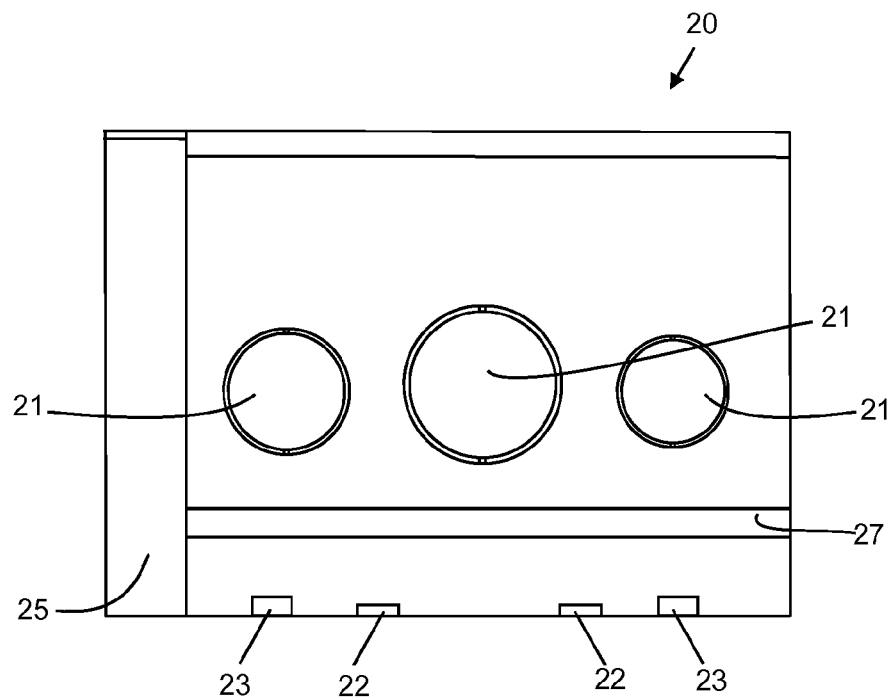
FIG. 19 is a side view of the present invention in the alternative PVC shaft embodiment.

On this tubing support 1 the element responsible for anchoring this structure to the slab after cure of the concrete 14 is the anchorage recess 27. Although FIGS. 16 and 19 show a linear recess, horizontally arranged on the outer side face of the tubing support 1, this anchoring recess 27 might exhibit different shapes and arrangements (including, instead of a recess, this structure might exhibit the physical form of a protrusion). The recess may also be designed to accommodate an iron that will aid in anchoring the tubing support 1 onto the concreted slab.

It should be noted that, during the slab concreting step, when the concrete 14 is poured onto the slab mold, the detachable side bores 21 and the lower detachable bore 24 may be perfectly sealed by means of a thin PVC sheet that is provisionally secured to the structure of the tubing support 1 by two or more support points. After pouring the slab, the detachable bores 21, 24 are opened and the cover 28 is removed from the structure of the tubing support 1. It is noted that the detachable bores 21, 24 may have any necessary diameter.

Then, the tubes 15 are inserted into the desired places and, right after insertion of the tubes 15, one pours a second portion of concrete 14 into the central cavity of the tubing support 1. This second portion of concrete 14 has the function of holding the tubes 15 fixed with respect to the structure of the tubing support 1. Additionally, the detachable bores 21, 24 may receive an elastic element, such as a circular rubber, so as to enable tight fitting between the tubes 15 and the tubing support 1.

Optionally, the tubing support 1 may comprise elements arranged on its side faces, which will enable modular association thereof with other PVC tubing supports 1 arranged adjacently.

Said elements may consist, for instance, of snap-fit locks of the male 23 and female 22 type; vertical recesses 25 analogously arranged with respect to vertical protrusions 26; or still other elements of side association, arranged in any of the faces of the PVC tubing support 1. It should still be noted that the male-type locks 23 may be provided with a boring that enables them to receive, for instance, a nail for securing the tubing support 1 to the wood frame.

A preferred example of embodiment having been described, one should understand that the scope of the present invention will embrace other possible variations, being limited only by the contents of the accompanying claims, which include the possible equivalents.

The invention claimed is:

1. A method of applying a tubing support (1) onto a slab, said method comprising the steps of:
    positioning the tubing support (1) at a desired location, the tubing support (1) comprising:
        (i) a removable layer (10) having a first thickness and a substantially flat first face (7) oriented in a first direction; and
        (ii) a permanent layer (11) having a second thickness and a substantially flat second face (8) oriented in a second direction, the permanent layer (11) being positioned adjacent the removable layer (10), the second direction being opposite the first direction;
    applying an initial concrete layer around the tubing support (1), the initial concrete layer forming the slab such that a substantially flat surface of the slab is parallel and aligned with the substantially flat first face (7) of the tubing support (1);
    removing the removable layer (10) from the tubing support (1);
    perforating the permanent layer (11) so as to form a through-bore (2) therein, the through-bore (2) being formed perpendicular relative to and passing through a portion of the substantially flat second face (8) of the permanent layer (11);
    positioning at least one tube (15) in the through-bore (2); and
    applying an additional concrete layer on top of the permanent layer (11) and around the at least one tube (15) so as to fix the at least one tube (15) in a stable position, the additional concrete layer having a thickness such that a substantially flat surface of the additional concrete layer aligns with the substantially flat surface of the slab.

2. The method of claim 1, wherein the step of perforating the permanent layer occurs after the step of removing the removable layer (10).

3. The method of claim 1, further comprising the step of positioning at least one tube (15) in the through-bore (2).

4. The method of claim 1, wherein:
    the method further comprises the step of removing a portion of the permanent layer (11) adjacent the perforation so as to form the through-bore (2); and
    the step of removing the portion of the permanent layer occurs after the step of perforating the permanent layer (11) and before the step of positioning the at least one tube (15) in the through-bore (2).

5. The method of claim 1, wherein:
    the tubing support (1) further comprises at least one side surface (3), said at least one side surface (3) having a first portion being defined by the first thickness of the removable layer (10) and a second portion being defined by the second thickness of the permanent layer (11);
    the first and the second portions of the at least one side surface (3) are configured to together correspond with at least two faces of a divider (17) between which the tubing support (1) is positioned; and
    the first and second thicknesses of the removable and permanent layers (10, 11) together define a height of the tubing support (1), the height of the tubing support (1) being substantially equivalent to a height of the divider (17).

6. The method of claim 5, wherein:
    the first portion of the at least one side surface (3) has a planar profile; and
    the second portion of the at least one side surface (3) has a non-planar profile.

7. The method of claim 1, wherein the removable layer (10) is made from a first material and the permanent layer (11) is made from a second material, the second material being different than the first material.

8. The method of claim 1, wherein the tubing support (1) is made from a low-density expanded polyethylene having a density between 15 and 40 Kg/m3.

9. The method of claim 1, wherein the at least one tube (15) positioned in the through-bore (2) is hydraulic tubing.

* * * * *